US012474886B2

(12) United States Patent
Zhang

(10) Patent No.: US 12,474,886 B2
(45) Date of Patent: Nov. 18, 2025

(54) SCREEN-PROJECTION DISPLAYING METHOD, APPARATUS, MOBILE TERMINAL, AND PROGRAM PRODUCT

(71) Applicant: GUANGDONG OPPO MOBILE TELECOMMUNICATIONS CORP., LTD., Guangdong (CN)

(72) Inventor: Kun Zhang, Guangdong (CN)

(73) Assignee: GUANGDONG OPPO MOBILE TELECOMMUNICATIONS CORP., LTD,., Guangdong (CN)

( * ) Notice: Subject to any disclaimer, the term of this patent is extended or adjusted under 35 U.S.C. 154(b) by 9 days.

(21) Appl. No.: 18/359,424

(22) Filed: Jul. 26, 2023

(65) Prior Publication Data

US 2023/0367537 A1    Nov. 16, 2023

Related U.S. Application Data

(63) Continuation of application No. PCT/CN2021/135846, filed on Dec. 6, 2021.

(30) Foreign Application Priority Data

Jan. 29, 2021    (CN) .................... 202110134626.1

(51) Int. Cl.
  *G06F 3/048* (2013.01)
  *G06F 3/04842* (2022.01)
  (Continued)

(52) U.S. Cl.
  CPC ........ *G06F 3/1454* (2013.01); *G06F 3/04842* (2013.01); *G06F 3/04845* (2013.01); *G06F 3/0488* (2013.01)

(58) Field of Classification Search
  CPC ............... G06F 3/1454; G06F 3/04842; G06F 3/04845; G06F 3/0488
  See application file for complete search history.

(56) References Cited

U.S. PATENT DOCUMENTS 9,232,044 B2 *    1/2016   Park .................... G06F 3/04842
2008/0168379 A1 *  7/2008  Forstall ............. H04M 1/72403
                                                                715/778
(Continued)

FOREIGN PATENT DOCUMENTS

CN    102591584 A    7/2012
CN    103279278 A    9/2013
(Continued)

OTHER PUBLICATIONS

Chinese First Office Action and search report for Chinese Patent Application No. 202110134626.1, mailed Apr. 23, 2024 (21 pages).
(Continued)

*Primary Examiner* — David Phantana-angkool
(74) *Attorney, Agent, or Firm* — Ladas & Parry, LLP

(57) ABSTRACT

A screen projection display method and apparatus, a mobile terminal, a storage medium, and a program product. The method comprises: when the interface content of a first application program is displayed on a screen projection display device, receiving a first instruction (201); in response to the first instruction, displaying an application selection interface, the application selection interface comprising an option of at least one second application program (202); receiving a second instruction for a target second application program among the at least one second application (203); and in response to the second instruction, projecting the interface content of the target second application program to the screen projection display device for display (204).

20 Claims, 10 Drawing Sheets

(51) Int. Cl.
*G06F 3/04845* (2022.01)
*G06F 3/14* (2006.01)
*G06F 3/0488* (2022.01)

(56) References Cited

U.S. PATENT DOCUMENTS

| | | | | |
|---|---|---|---|---|
| 2014/0189584 | A1* | 7/2014 | Weng | G06F 3/04883 |
| | | | | 715/833 |
| 2015/0227492 | A1* | 8/2015 | Bai | G06F 3/04842 |
| | | | | 715/762 |
| 2015/0253974 | A1 | 9/2015 | Young et al. | |
| 2017/0228207 | A1* | 8/2017 | Szeto | G06F 3/0416 |
| 2019/0227909 | A1 | 7/2019 | Kwong et al. | |
| 2020/0042274 | A1 | 2/2020 | Park et al. | |
| 2021/0064191 | A1 | 3/2021 | Liao et al. | |
| 2022/0027117 | A1* | 1/2022 | Liu | G06F 3/0482 |
| 2023/0367537 | A1* | 11/2023 | Zhang | G06F 3/1454 |
| 2024/0053879 | A1* | 2/2024 | Wang | G09G 5/14 |
| 2024/0220095 | A1* | 7/2024 | Ye | H04N 21/485 |
| 2024/0257444 | A1* | 8/2024 | Kang | G06F 9/451 |

FOREIGN PATENT DOCUMENTS

| | | |
|---|---|---|
| CN | 109889885 A | 6/2019 |
| CN | 110381195 A | 10/2019 |
| CN | 110515579 A | 11/2019 |
| CN | 110536008 A | 12/2019 |
| CN | 111787392 A | 10/2020 |
| CN | 111857925 A | 10/2020 |
| CN | 111857926 A | 10/2020 |
| CN | 112148181 A | 12/2020 |
| CN | 112149194 A | 12/2020 |
| CN | 110515576 A | 6/2021 |
| EP | 3860132 A1 | 8/2021 |
| WO | 2017173793 A1 | 10/2017 |
| WO | 2020098437 A1 | 5/2020 |

OTHER PUBLICATIONS

European Search Report, European Patent Application No. 21922530.7, mailed Ju. 24, 2024.
International Search Report, International Application No. PCT/CN2021/135846, mailed Feb. 28, 2022.
Written Opinion of the International Searching Authority in International Application No. PCT/CN2021/135846, mailed on Feb. 28, 2022, with English translation provided by WIPO.
Chinese Notification to Grant Patent Right for Invention, from corresponding Chinese Application No. 202110134626.1, mailed Aug. 6, 2024 (5 pages).

* cited by examiner

SCREEN-PROJECTION DISPLAYING METHOD, APPARATUS, MOBILE TERMINAL, AND PROGRAM PRODUCT

CROSS REFERENCE TO RELATED APPLICATIONS

The present application is a continuation application of the international patent application No. PCT/CN2021/135846, filed on Dec. 6, 2021, which claims the priority to Chinese patent application No. 202110134626.1, filed on Jan. 29, 2021, and the contents of which are incorporated herein by their entireties.

TECHNICAL FIELD

The present disclosure relates to the field of screen projection, and in particular to a screen-projection displaying method, an apparatus, a mobile terminal, and a program product.

BACKGROUND

Screen projection refers to a technology of displaying content of device A in a screen of a device B.

In the art, a user opens a user interface of an application A in the device A and clicks on a screen-projection control in the user interface of the application A to project displayed content of the application A to be displayed in the device B. When the user does not want to project the displayed content of the application A, the user opens a user interface of an application B and clicks on a screen-projection control in the user interface of the application B to project displayed content of the application B to be displayed in the device B.

SUMMARY OF THE DISCLOSURE

The present disclosure provides a screen-projection displaying method, an apparatus, a mobile terminal, and a program product. Technical solutions are as follows.

According to a first aspect of the present disclosure, a screen projection displaying method is provided and applied in a mobile terminal. The method includes:
  receiving, when content of an interface of a first application is displayed on a screen projection display device, a first instruction, wherein the first application is an application running on the mobile terminal;
  displaying, in response to the first instruction, an application selection interface, wherein the application selection interface comprises at least one second application, each of the at least one second application has an option;
  receiving a second instruction specifically for a target second application of the at least one second application; and
  projecting, in response to the second instruction, content of an interface of the target second application to the screen projection display device.

According to a second aspect of the present disclosure, a mobile terminal is provided and includes a processor and a memory. The memory stores computer programs, the computer programs are loaded and executed by the processor to perform the screen projection displaying method as described in the above.

According to a third aspect of the present disclosure, a computer readable storage medium, storing computer programs is provided. The computer programs are loaded and executed by a processor to perform the screen projection displaying method as described in the above.

DETAILED DESCRIPTION

In order to make the object, technical solutions and advantages of the present disclosure clearer, embodiments of the present disclosure will be described in further details in the following by referring to the accompanying drawings.

Figure 1:
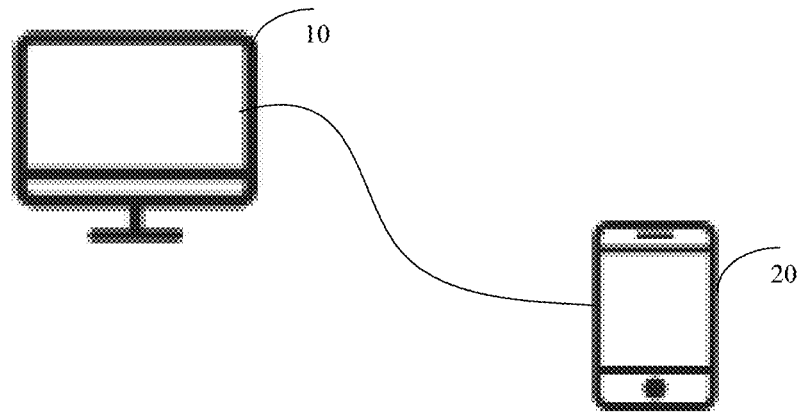
FIG. 1 is a schematic view of a screen projection system according to an embodiment of the present disclosure.

FIG. 1 is a schematic view of a screen projection system according to an embodiment of the present disclosure. The system includes a screen projection display device 10 and a mobile terminal 20.

In the present embodiment, the screen projection display device 10 is a device for displaying content of screen projection. In some implementations, the screen projection display device 10 may be a television, a personal computer (PC), a desktop computer, a projector, a vehicle mounted device, a smart display, a tablet, a mobile phone, and other devices. The present embodiment does not limit a type of the screen projection display device 10.

In the present embodiment, the mobile terminal 20 is a device for providing the content of screen projection. In some implementations, the mobile terminal 20 may be an electronic device, such as a mobile phone, a tablet, a smart wearable device, a multimedia device, and so on. The present embodiment does not limit a type of the mobile terminal 20.

Exemplarily, the screen projection display device 10 and the mobile terminal 20 may be devices produced by a same manufacturer. Of course, in some implementations, the screen projection display device 10 and the mobile terminal 20 may be devices produced by different manufacturers. The present embodiment does not limit the manufactures.

Exemplarily, a size of a screen of the screen projection display device 10 may be greater than a size of a screen of the mobile terminal 20.

Exemplarily, the mobile terminal 20 has a wireless screen projection function. By enabling the wireless screen projection function of the mobile terminal 20, content of an interface of an application of the mobile terminal 20 may be projected to be displayed on the screen projection display device 10.

In the following, embodiments of the present disclosure will be described.

Figure 2:
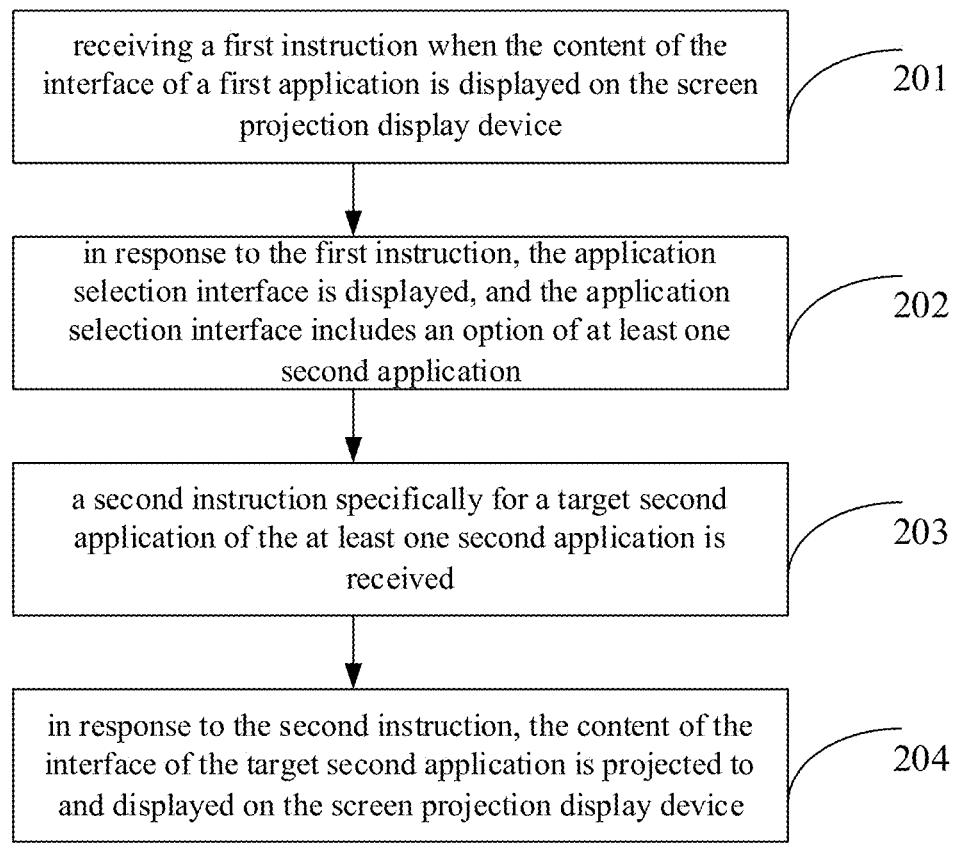
FIG. 2 is a flow chart of a screen projection displaying method according to an embodiment of the present disclosure.

FIG. 2 is a flow chart of a screen projection displaying method according to an embodiment of the present disclosure. The method may be applied to the mobile terminal 20 shown in the FIG. 1. The method includes the following operations.

In an operation 201, receiving a first instruction in response to the content of the interface of a first application being displayed on the screen projection display device.

The first application is an application running on the mobile terminal. The first application may be any application. The first application may be any one of: a video application, a social application, a music application, an image application, a game application, and so on. The present embodiment does not limit a type of the first application.

Exemplarily, when the first application is the video application, the content, which is of the interface of the first application and is displayed on the screen projection display device, may be a video playing interface of a video resource provided by the first application. When the first application is the social application, the content of the interface of the first application displayed on the screen projection display device may be a chat interface, a voice call interface, a video call interface, and so on. When the first application is the music application, the content of the interface of the first application displayed on the screen projection display device may be a music playing interface of a music resource provided by the first application. When the first application is the image application, the content of the interface of the first application displayed on the screen projection display device may be an image. When the first application is the game application, the content of the interface of the first application displayed on the screen projection display device may be a game match view of a game.

The first instruction is configured to trigger the mobile terminal to display an application selection interface. The first instruction may be an application switching instruction (the application switching instruction refers to an instruction for switching a screen projection application), an interface displaying instruction (the interface displaying instruction refers to an instruction configured to display the application selection interface), a multitask window display instruction, and so on. The present disclosure does not limit the first instruction. In some implementations, the first instruction may be triggered by a touch, a gesture, a voice, and so on.

In some implementations, after communicative connection is established between the mobile terminal and the screen projection display device, the user opens the user interface of the first application and clicks on a screen-projection control in the user interface of the first application to send the content of the interface of the first application to the screen projection display device. In this way, the content of the interface of the first application may be displayed on the screen projection display device.

In some implementations, after communicative connection is established between the mobile terminal and the screen projection display device, the user selects the first application through the application selection interface to allow the content of the interface of the first application to be sent to and displayed on the screen projection display device. That is, the content of the interface of the first application is projected to and displayed on the screen projection display device.

In some implementations, after communicative connection is established between the mobile terminal and the screen projection display device, content of the mobile terminal is displayed in real time on the screen projection display device. When the mobile terminal sends the content of the interface of the first application to the screen projection display device, the screen projection display device displays the content of the interface of the first application. Afterwards, any operation performed by the user on the mobile terminal is not displayed in real time on the screen projection display device.

In some implementations, the screen projection display device and the mobile terminal may display different contents. For example, when the screen projection display device is displaying the content of the interface of the first application, the mobile terminal may be displaying content different from the content of the interface of the first application. For example, the mobile terminal may display a control interface, a device interface, or an interface of another application, and so on. The present disclosure does not limit the displayed content.

Exemplarily, the content of the interface of the first application may be referred to as screen projection content of the first application, displayed content of the first application, and so on, which will not be limited herein.

In an operation 202, in response to the first instruction, the application selection interface is displayed, and the application selection interface includes an option of at least one second application.

The application selection interface is an interface configured to select an application for screen projection. Exemplarily, the application selection interface may also be referred to as a multitask management interface.

The option of the application is configured to allow the user to select an application. Exemplarily, the option of the selection may be a task window of the application.

Exemplarily, the at least one second application and the first application may belong to one type or different types. Alternatively, some of the at least one second application and the first application may belong to one type. The present disclosure does not limit the type of the applications. The at least one second application may include or may not include the first application. When the first application is not projected to be displayed on the screen projection display device, the at least one second application may include the first application. When the first application is projected to be displayed on the screen projection display device, the at least one second application may not include the first application.

Exemplarily, the at least one second applications may be an application already running in the mobile terminal. For example, the at least one second application may be an application running in a background in the mobile terminal. When the mobile terminal is displaying the application selection interface, a running state of any application running in a foreground may be changed to be running in the background.

Exemplarily, the at least one second application may be the application that is already running in the mobile terminal or may be an application that is not running in the mobile terminal (an application that is not in a running state).

Exemplarily, the at least one second applications may be an application selected by the user. For example, the user may select, from a setting interface, an application that the user desires to project and display on the screen projection display device. The mobile terminal determines the application selected by the user as the second application and displays the determined second application in the application selection interface.

In an operation 203, a second instruction specifically for a target second application of the at least one second application is received.

The target second application may be any one of the at least one second application.

The second instruction is configured to trigger projection of content of an interface of the target second application to the screen projection display device. For example, the second instruction may be a screen-projection switching instruction, a screen projection instruction, and so on. Exemplarily, the second instruction may be triggered by a touch, a voice, a gesture, and so on.

In an operation 204, in response to the second instruction, the content of the interface of the target second application is projected to and displayed on the screen projection display device.

Exemplarily, the mobile terminal and the screen projection display device communicate with each other via a wireless network. The mobile terminal and the screen projection display device may be in a same local area network. Exemplarily, the mobile terminal sends the content of the interface of the target second application to the screen projection display device via the wireless network, enabling the sent content to be projected and displayed. After receiving the content of the interface of the target second application, the screen projection display device switches from displaying the content of the interface of the first application into displaying the content of the interface of the target second application.

Exemplarily, before the screen projection display device receives the content of the interface of the target second application sent from the mobile terminal, the screen projection display device constantly displays the content of the interface of the first application, and the screen projection display device does not display the application selection interface. That is, the user may select the application that the user wishes to switch to via the mobile terminal, while the user is viewing the content of the interface of the first application displayed on the screen projection display device.

By contrast, in the art, while content that is projected on the screen is to be switched, a screen projection panel may be revoked, and content to be projected may be selected subsequently. In the present disclosure, the application of the mobile terminal that is projected to the screen projection display device may be switched without exiting the current screen projection. In the present disclosure, a path of switching applications built in the mobile terminal may be applied, user's expectations may be met, and switching operations may be achieved more fluently.

According to the above description, in the present disclosure, the target second application may be selected from the application selection interface. The application selection interface includes the option of at least one second application. The user may trigger the instruction for the target second application in the application selection interface. In this way, the screen projection display device may display the content of the interface of the target second application. Compared to the art where the user needs to open the user interface of the application and find the screen projection control to trigger the content of the screen-projection switching interface, the present disclosure provides a simplified process of switching the screen-projection content, and the efficiency of switching the screen-projection content may be improved.

Figure 3:
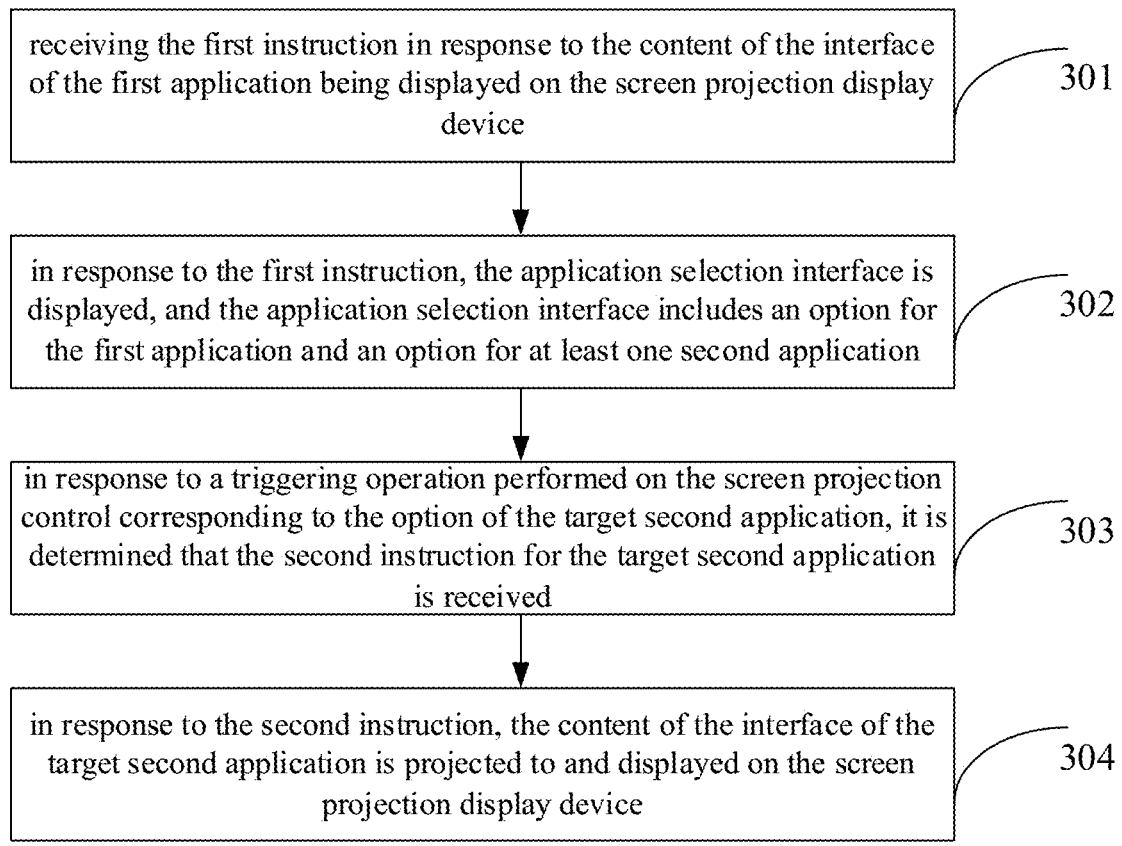
FIG. 3 is a flow chart of a screen projection displaying method according to another embodiment of the present disclosure.

FIG. 3 is a flow chart of a screen projection displaying method according to another embodiment of the present disclosure. The method can be applied to the mobile terminal shown in FIG. 1, and the includes following operations.

In an operation 301, receiving the first instruction in response to the content of the interface of the first application being displayed on the screen projection display device.

In some implementations, an upward sliding operation signal corresponding to a system desktop is obtained. In response to the upward sliding operation signal, it is determined that the first instruction is received. The system desktop is a user interface seen after the mobile terminal is turned on and the operating system is running. The system desktop is usually referred to as a desktop. The system desktop is a user interface for the user to interact with the mobile terminal, and the user may open an application on the system desktop.

Figure 4:
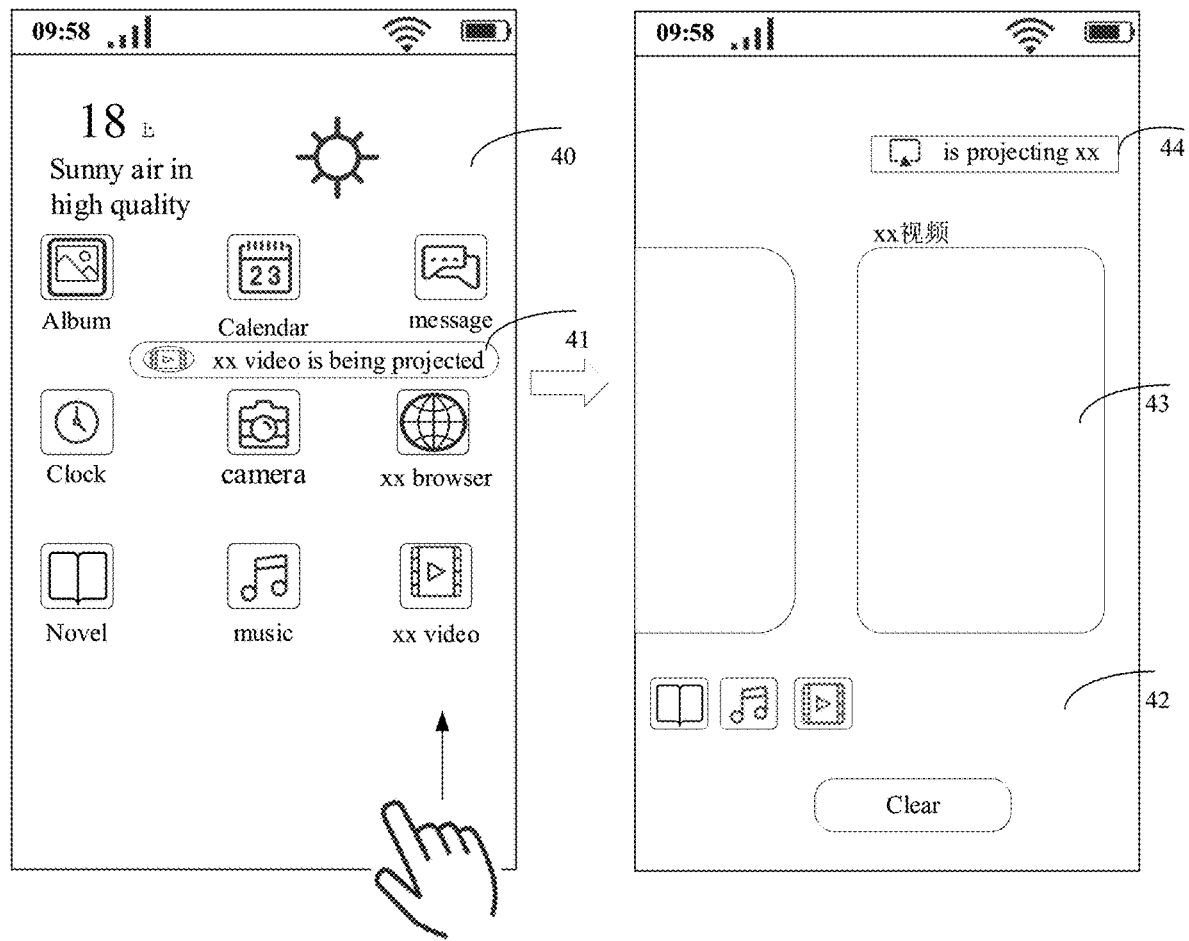
FIG. 4 is a schematic view of a systemic desktop according to an embodiment of the present disclosure.

In an embodiment, the system desktop may display icons of a plurality of applications or a desktop plug-in corresponding to an application. As shown in FIG. 4, FIG. 4 is a schematic view of a systemic desktop according to an embodiment of the present disclosure. The system desktop 40 displays an icon for the application "photo album", an icon for the application "music", an icon for the application "novel", an icon for the application "xx video", and so on. The system desktop 40 further displays a desktop plug-in for the application "Weather".

The system desktop 40 may include one or more user interfaces. Each of the one or more user interfaces displays icons of one or more applications. The present disclosure does not limit the icon and interface displaying.

The upward sliding operation signal corresponding to the system desktop refers to a signal generated by an upward sliding operation performed by the user on a touch display of the mobile terminal having the system desktop.

The user may trigger the upward sliding operation signal corresponding to the system desktop by sliding the user's finger upward on any user interface included in the system desktop.

In an embodiment, in response to the content of the interface of the first application being displayed on the screen projection display device, the mobile terminal displaying an alert message. The alert message is configured to indicate that the content of the interface of the first application is being displayed on the screen projection display device. Exemplarily, in an example where the first application is the application "xx video", mobile terminal displays a prompt message 41 in response to the content of the interface of the application "xx video" being displayed on the screen projection display device.

In an implementation, the system desktop of the mobile terminal includes a first control. The user touches the first control, and the mobile terminal receives the first instruction. The first control is a control for triggering the application selection interface to be displayed.

In an operation 302, in response to the first instruction, the application selection interface is displayed, and the application selection interface includes an option for the first application and an option for at least one second application.

In an implementation, in response to the first instruction, the application selection screen is displayed at an upper level of the system desktop. Exemplarily, a display level of application selection interface is higher than a display level of the system desktop. As shown in FIG. 4, the user performs an upward sliding operation on the touch display to trigger the first instruction to display the application selection interface 42. Exemplarily, the option for each application in the application selection interface corresponds to one screen projection control. Exemplarily, the application selection interface may further include the option 43 for the first application and a projection control 44 corresponding to the option of the first application. In response to the content of the interface of the first application being projected to and displayed on the screen projection display device, a displaying state of the projection control 44 corresponding to the option of the first application is a projection displaying state. The screen projection control is a control configured to change a screen projection state.

In an operation 303, in response to a triggering operation performed on the screen projection control corresponding to the option of the target second application, it is determined that the second instruction for the target second application is received.

Exemplarily, each of the at least one second application has one option corresponding to one screen projection control. The triggering operation of the screen projection control may be triggered by a voice, a gesture, a touch, and so on.

Figure 5:
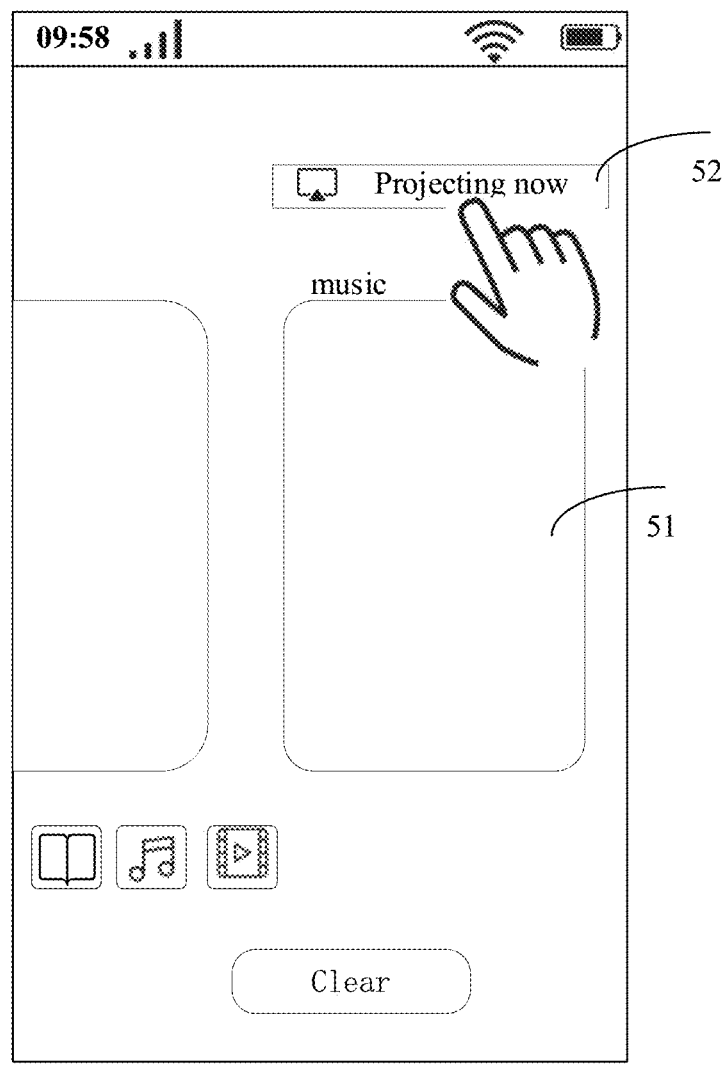
FIG. 5 is a schematic view of an application selection interface according to an embodiment of the present disclosure.

As shown in FIG. 5, for example, the target second application the application "music". The option 51 of the application "music" corresponds to a screen projection control 52. The user clicks on the screen projection control 52 corresponding to the option 51 of the application "music". The mobile terminal receives a trigger operation on the screen projection control corresponding to the option of the application "music", and determines that a second instruction for the application "music" is received.

Exemplarily, when the mobile terminal does not receive the trigger operation on the screen projection control corresponding to the option of the target second application, a displaying state of the screen projection control corresponding to the option of the target second application is an unprojected displaying state. The user may determine a screen projection state of the application based on the displaying state of the screen projection control. The displaying state of the screen projection control includes the unprojected displaying state (a displaying state of the screen projection control when the application is not projected, the unprojected displaying state is configured to indicate that the application is not projected) and a projected-and-displaying state (a displaying state of the screen projection control when the application is being projected, the projected-and-displaying state is configured to indicate that the application is being projected). When the displaying state of the projection control is the unprojected displaying state, the application is unprojected. When the displaying state of the projection control is the projected-and-displaying state, the application is being projected.

In an operation 304, in response to the second instruction, the content of the interface of the target second application is projected to and displayed on the screen projection display device.

Description of the operation 304 may be referred to the embodiment above and will not be repeated here.

Figure 6:
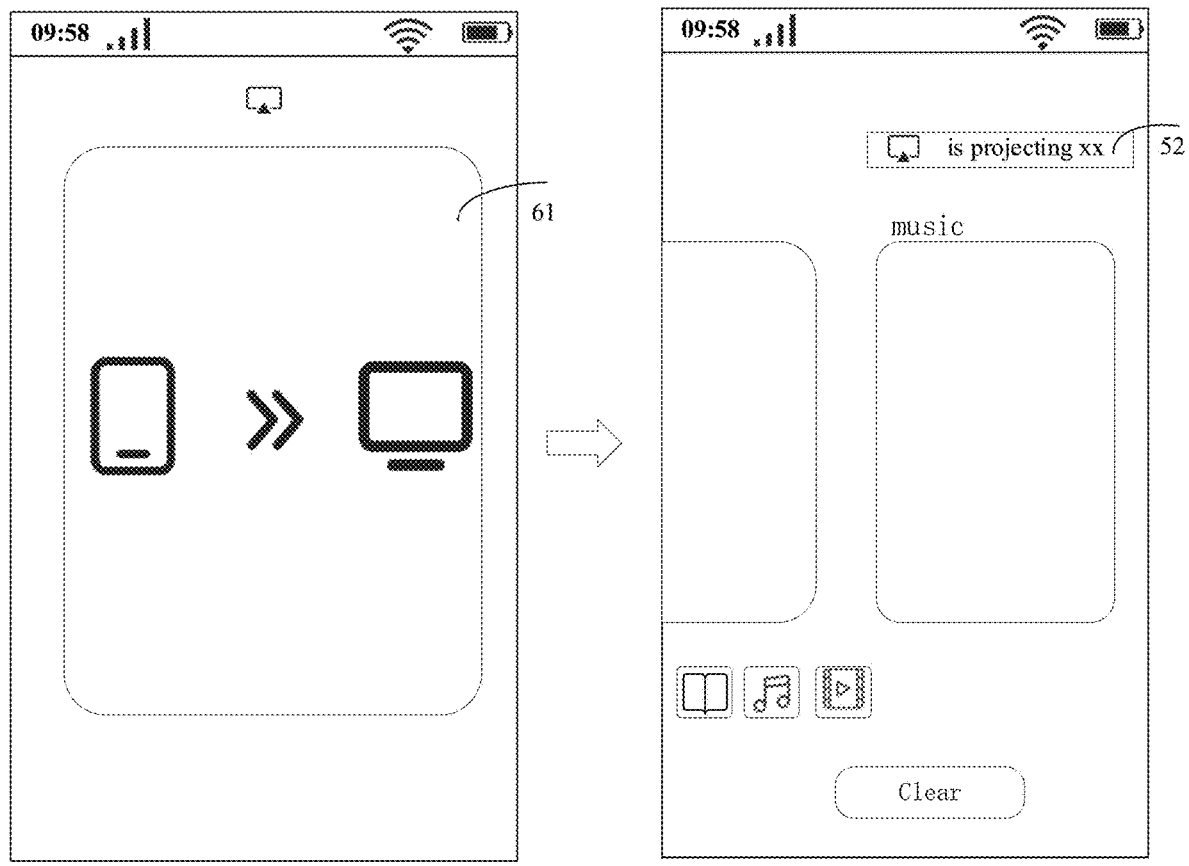
FIG. 6 is a schematic view of an application selection interface according to another embodiment of the present disclosure.

In an embodiment, after the mobile terminal receives the second instruction for the target second application of the at least one second application, a preset animation is played. After playing the preset animation is completed, the displaying state of the screen projection control corresponding to the option of the target second application is switched from the unprojected displaying state into the projection-and-displaying state. As shown in FIG. 5 and FIG. 6, after the user clicks on the screen projection control 52 corresponding to the option 51 of the application "music", the mobile terminal plays the preset animation 61. After playing the preset animation 61 is completed, the displaying state of the screen projection control 52 corresponding to the option of the application "music" is switched from the unprojected displaying state to the projected-and-displaying state. The setting animation is an animation played in the mobile terminal within a time period when the mobile terminal obtains the screen projection display operation performed by the user, and the time period is from a time point when the user completes the screen projection display operation in the mobile terminal to a time point when the screen projection display device successfully displays the screen projection content. The preset animation may also be referred to as a screen projection animation. In other words, the preset animation refers to an animation played in the mobile terminal when the content of the interface of the target second application is not successfully sent to the screen projection display device. The preset animation may also be referred to as the screen projection animation. Exemplarily, when the mobile terminal switches the interface content sent to the screen projection display device, the mobile terminal needs a buffer time to obtain the content of the interface of the target second application and send the content of the interface of the target second application to the screen projection display device successfully. By playing the preset animation on the mobile terminal, the user experience may be improved by avoiding the discomfort caused by a sudden change in the interface.

In an implementation, the application selection interface further includes the option for the first application and the screen projection control corresponding to the option for the first application. The mobile terminal may cancel a screen projection task for the first application before receiving the second instruction for the target second application of the at least one second application. Cancelling the screen projection task for the first application may include the following. Projecting and displaying the content of the interface of the first application to the screen projection display device is terminated in response to a trigger operation performed on the screen projection control corresponding to the option for the first application.

When the content of the interface of the first application is projected to and displayed on the screen projection display device, the displaying state of the screen projection control corresponding to the option of the first application is the screen projection-and-displaying state. When the mobile terminal receives the trigger operation performed on the screen projection control corresponding to the option of the first application, the displaying state of the screen projection control corresponding to the option of the first application is switched from the screen projection-and-displaying state to the unprojected displaying state.

Before the target second application is selected, screen projection of the first application is exited, such that power consumption of the screen projection display device may be reduced.

In an implementation, when the mobile terminal stops projecting the content of the interface of the first application to the screen projection display device, and when the mobile terminal does not send the content of the interface of the target second application to the screen projection display device, the screen projection display device may be in a standby state and display a standby interface, such that the power consumption of the screen projection display device is reduced.

In an implementation, in order to avoid mis-operation, the mobile terminal switches the displaying state of the screen projection control corresponding to the option of the first application from the projection-and-displaying state to a projection cancellation confirmation state, before terminating the projection of the content of the interface of the first application to the screen projection display device. In response to a trigger operation performed on the screen projection control which is in the projection cancellation confirmation state, the mobile terminal performs the operation of terminating the projection of the content of the interface of the first application to the screen projection display device.

Exemplarily, in addition to the projection-and-displaying state and the unprojected displaying state, the displaying state of the projection control further includes the projection cancellation confirmation state. The projection cancellation confirmation state is configured to indicate whether to continue to cancel the screen projection. The displaying state of the projection control may be switched from the projection-and-displaying state to the projection cancellation confirmation state, and then switched from the projection cancellation confirmation state to the unprojected displaying state.

Figure 7:
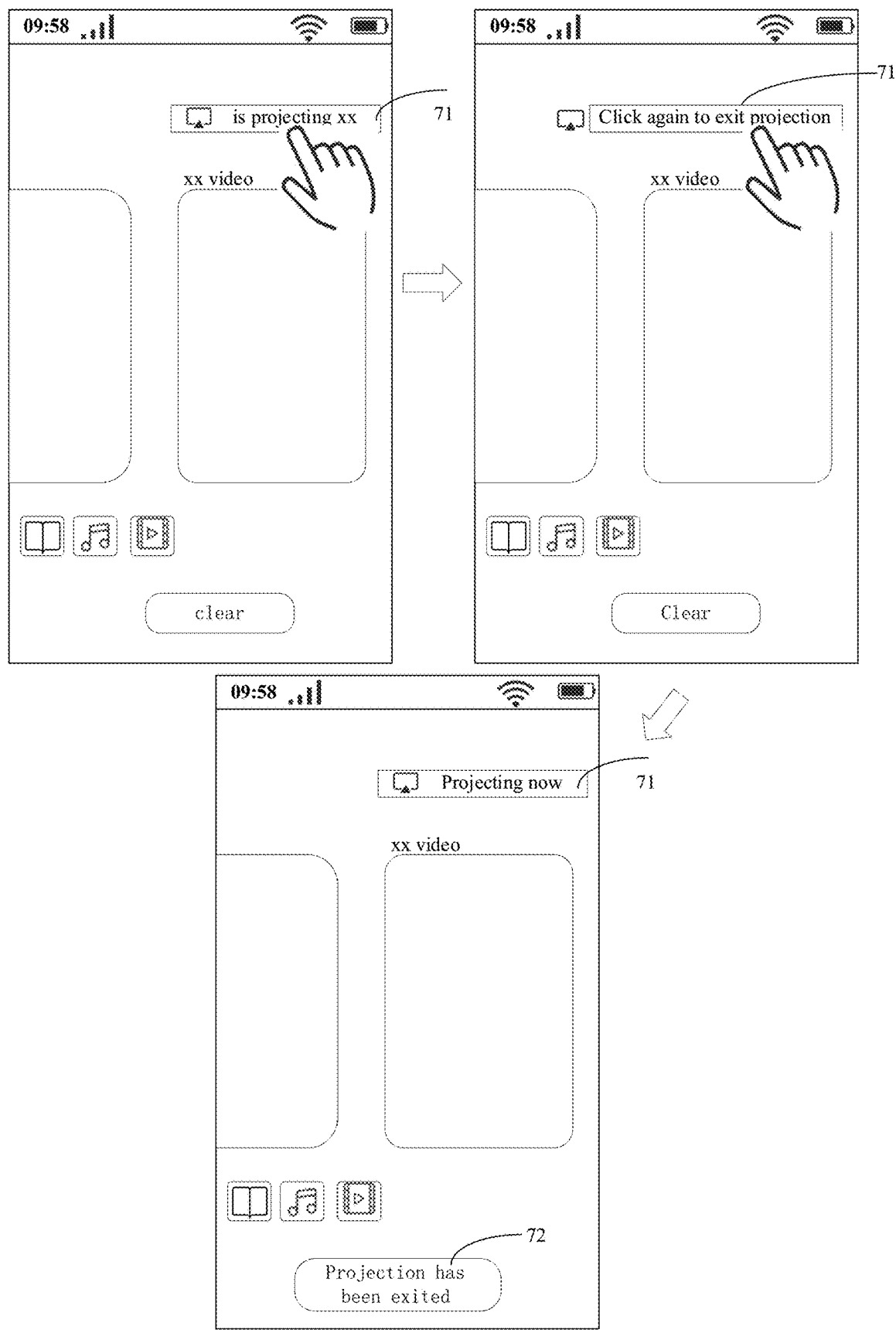
FIG. 7 is a schematic view of an application selection interface according to still another embodiment of the present disclosure.

As shown in FIG. 7, when the mobile terminal receives a trigger operation performed on the screen projection control 71 which has the screen projection-and-displaying state, the mobile terminal switches the displaying state of the screen projection control 71 from the screen projection-and-displaying state into the projection cancellation confirmation state. When the mobile terminal receives a trigger operation performed on the screen projection control which has the projection cancellation confirmation state, it is determined that a projection exit instruction for the first application is received, and the content of the interface of the first application is stopped from being projected to and being displayed on the screen projection display device. Further, the displaying state of the screen projection control 71 is switched from the projection cancellation confirmation state into the unprojected displaying state. Exemplarily, when the mobile terminal stops projecting the content of the interface of the first application to the screen projection device, the mobile terminal displays a screen projection exit message 72. The screen projection exit message 72 is configured to indicate that the screen projection has been exited. The user is allowed to confirm the cancellation twice, such that mis-touching may be avoided, and the user experience may be improved.

In an implementation, the user does not need to cancel the screen projection for the first application firstly. When the mobile terminal receives the second instruction, the mobile terminal automatically cancels the screen projection for the first application. Therefore, operations can be easily performed.

In summary, according to the present disclosure, the trigger operation performed on the screen casting projection corresponding to the option of the application is received to allow the content of the interface of the application after performing the switching to be sent to the screen projection display device. Operations can be easily performed.

Figure 8:
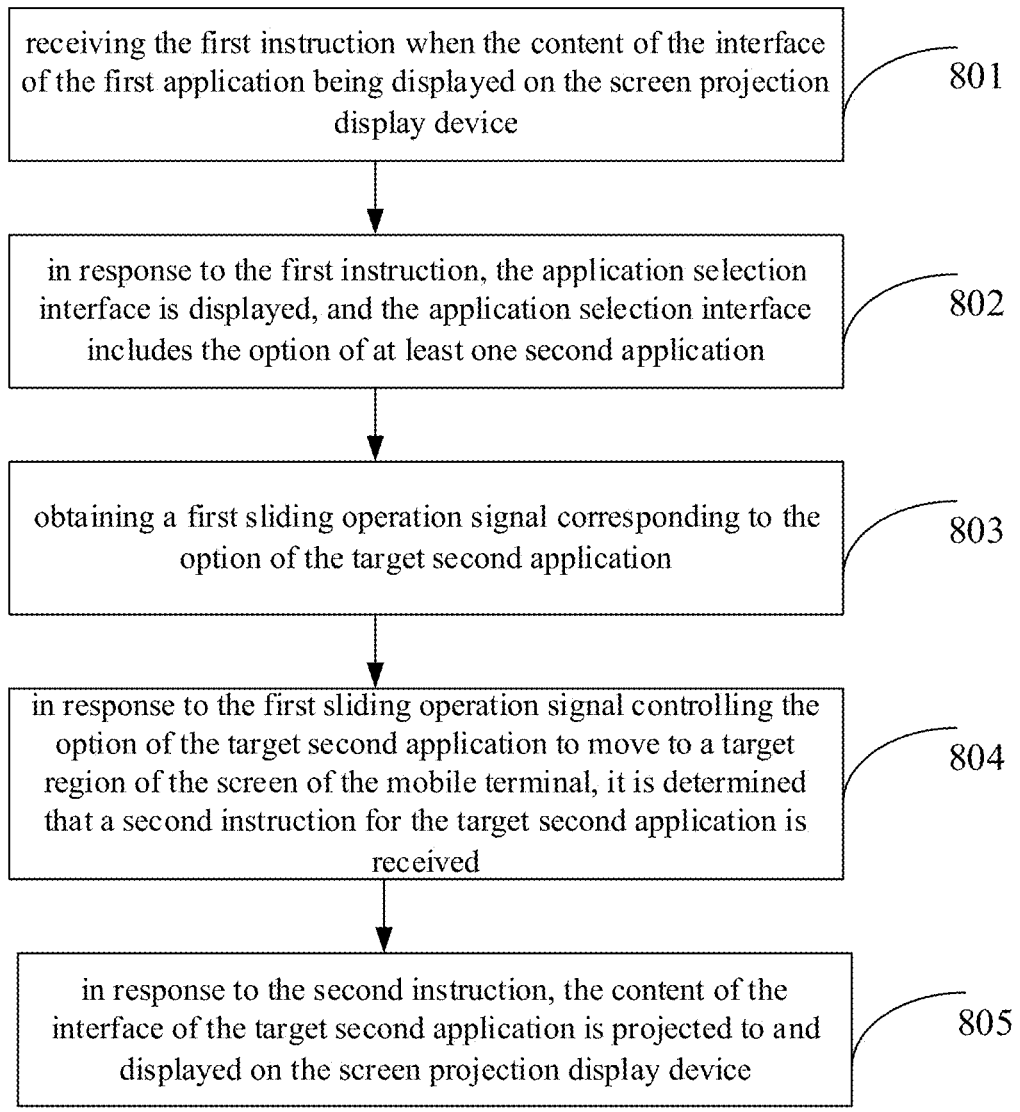
FIG. 8 is a flow chart of a screen projection displaying method according to still another embodiment of the present disclosure.

FIG. 8 is a flow chart of a screen projection displaying method according to still another embodiment of the present disclosure. The method can be applied to the mobile terminal shown in FIG. 1 and includes the following operations.

In an operation 801, receiving the first instruction in response to the content of the interface of the first application being displayed on the screen projection display device.

In an operation 802, in response to the first instruction, the application selection interface is displayed, and the application selection interface includes the option of at least one second application.

Descriptions of the operations 801 and 802 may be referred to previous embodiments and will not be repeated herein.

In an operation 803, obtaining a first sliding operation signal corresponding to the option of the target second application.

Figure 9:
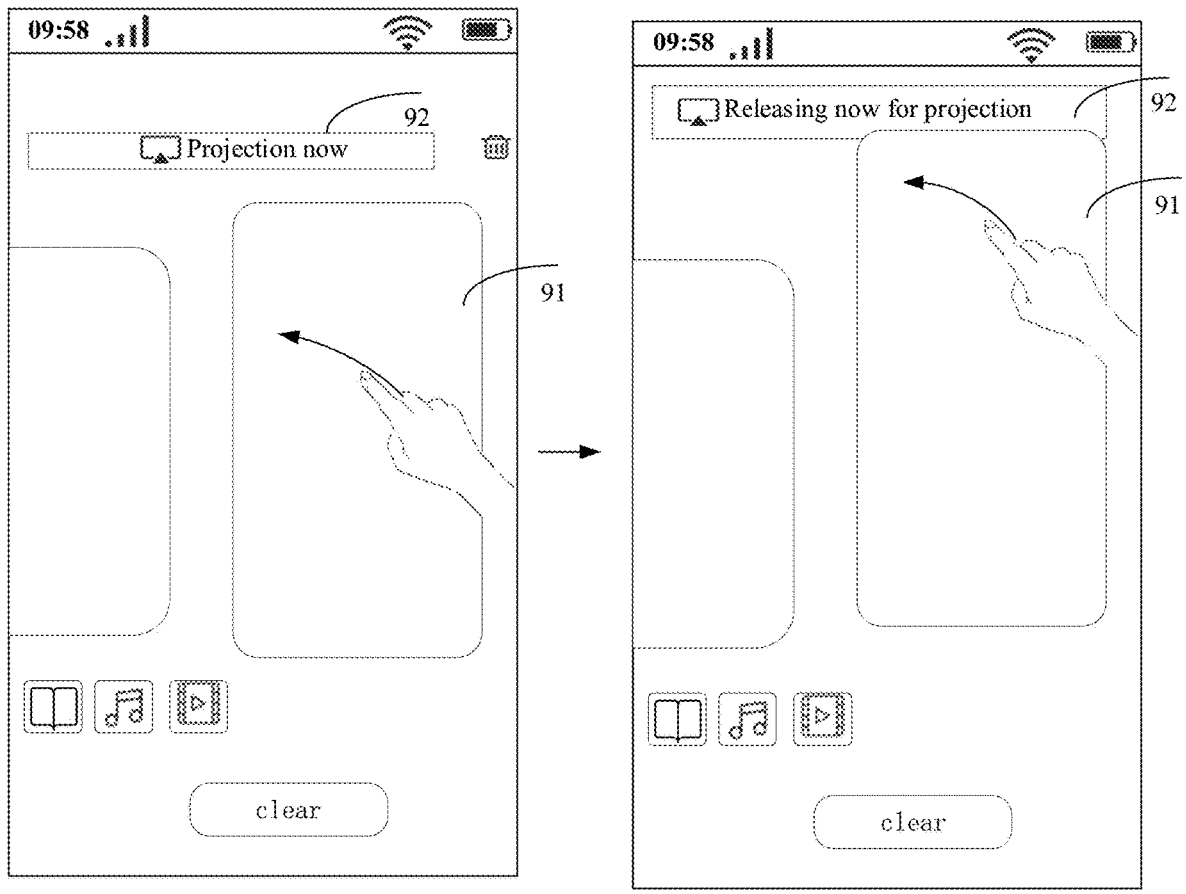
FIG. 9 is a schematic view of an application selection interface according to still another embodiment of the present disclosure.

The first sliding operation signal is a sliding operation signal that triggers the screen projection. A method of triggering the first sliding operation signal may be determined by a technician. For example, the technician may determine a sliding operation signal, which corresponds to a gesture having a sliding trend to a left in a vertical direction, as the first sliding operation signal. As shown in FIG. 9, the mobile terminal obtains the first sliding operation signal corresponding to the option 91 of the target second application.

In an operation 804, in response to the first sliding operation signal controlling the option of the target second application to move to a target region of the screen of the mobile terminal, it is determined that a second instruction for the target second application is received.

The target region is a region of the screen of the mobile terminal. An area of the target region may be determined by the technician. Exemplarily, the target region may be a top region of the screen of the mobile terminal. The technician may determine the target region based on a length and a width of the screen of the mobile terminal.

The option of the target second application moves upwards under control of the first sliding operation signal. When the target region is located at the top of the screen of the mobile terminal, the option of the target second application moves upwards under the control of the first sliding operation signal. The option of the target second application moving to the target region of the screen of the mobile terminal may mean that a part or all of the option of the target second application is located within the target region.

In an embodiment, each of the at least one second application has one option, and the option corresponds to one screen projection control. After the mobile terminal obtains the first sliding operation signal corresponding to the option of the target second application, the displaying state of the screen projection control corresponding to the option of the target second application is switched from the unprojected displaying state into a screen projection confirmation state in response to the first sliding operation signal controlling the option of the target second application to move to the target region of the screen of the mobile terminal.

Exemplarily, the displaying state of the screen projection control further includes the screen projection confirmation state, and the screen projection confirmation state refers to a state in which it is to be confirmed whether the content is projected or unprojected. As shown in FIG. 9, when the option of the target second application is located in the target region, the mobile terminal switches the displaying state of the screen projection control 92 from the unprojected displaying state into the screen projection confirmation state.

In an embodiment, when the first sliding operation signal controls the option of the target second application to move to the target region of the screen of the mobile terminal, a control state of the screen projection control changes. The control state of the screen projection control includes at least one of: a size state of the control, a colour state of the control, a displaying state of the control (i.e., the displaying state described above), and so on. A change in the size state of the control includes the control becoming larger or smaller. A change in the displaying state of the control includes a change in a text of the screen projection control (that is, switching from the unprojected displaying state into the projection confirmation state). When the option of the target second application is moved to the target region, the mobile terminal informs the user by changing the control state of the screen projection control. In this case, the user releases the option of the target second application to achieve screen projection.

In an implementation, the target region corresponds to a threshold value. The threshold value is a range at which the option of the application initially contacts the target region. The mobile terminal may change the control state to indicate that the user can release to achieve the screen projection when the option of the target second application is at the threshold value.

In an operation 805, in response to the second instruction, the content of the interface of the target second application is projected to and displayed on the screen projection display device.

Descriptions of the operation 805 may be referred to previous embodiments and will not be repeated herein.

In an implementation, after displaying the application selection interface, the mobile terminal obtains the sliding operation signal corresponding to the option of the target second application. The mobile terminal determines, in response to the sliding operation signal satisfying a first trend, that the first sliding operation signal for the option of the target second application is received. The mobile terminal determines, in response to the sliding operation signal satisfying a second trend, that a second sliding operation signal for the option of the target second application is received. The first trend and the second trend are two different trends.

The first trend and the second trend may be determined by the technician. Exemplarily, the first trend may be a vertical direction offset towards a left, and the second trend may be the vertical direction offset towards a right. The mobile terminal needs to determine whether the sliding operation signal triggered by the user is the first sliding operation signal or the second sliding operation signal, and further performs an operation corresponding to the determined sliding operation signal.

In an implementation, each of the at least one second application has one option, and the option corresponds to one screen projection control. After the mobile terminal obtains the sliding operation signal corresponding to the option of the target second application, in response to the first sliding operation signal for the option of the target second application being received, the mobile terminal displays the screen projection control corresponding to the option of the target second application in the target region.

Figure 10:
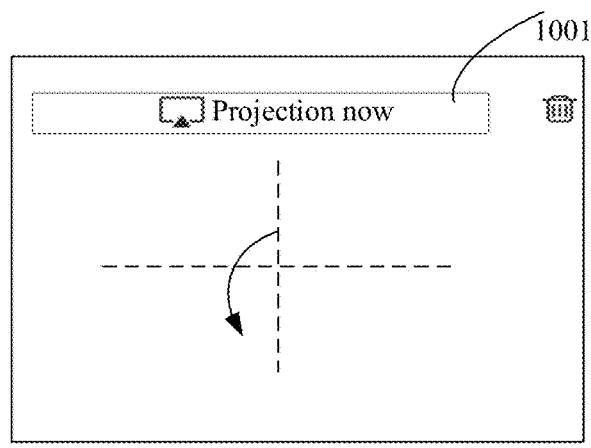
FIG. 10 is a schematic view of a screen-projection control according to an embodiment of the present disclosure.

As shown in FIG. 10, the mobile terminal displays the screen projection control 1001 corresponding to the option of the target second application in the target region, in response to determining that the first sliding operation signal for the option of the target second application is received.

In an implementation, the at least one second application has one option, and the option has one removing control. After the mobile terminal obtains the sliding operation signal corresponding to the option of the target second application, in response to determining that the second sliding operation signal for the option of the target second application is received, the mobile terminal displays the removing control corresponding to the option of the target second application in the target region.

Figure 11:
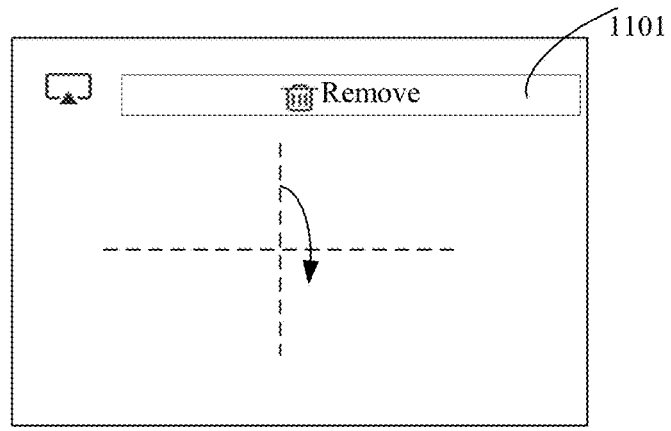
FIG. 11 is a schematic view of a removing control according to an embodiment of the present disclosure.

The removing control is a control configured to trigger removal of an option of an application. As shown in FIG. 11, the mobile terminal displays the removing control 1101 corresponding to the option of the target second application in the target region in response to determining that the second sliding operation signal for the option of the target second application is received.

Figure 12:
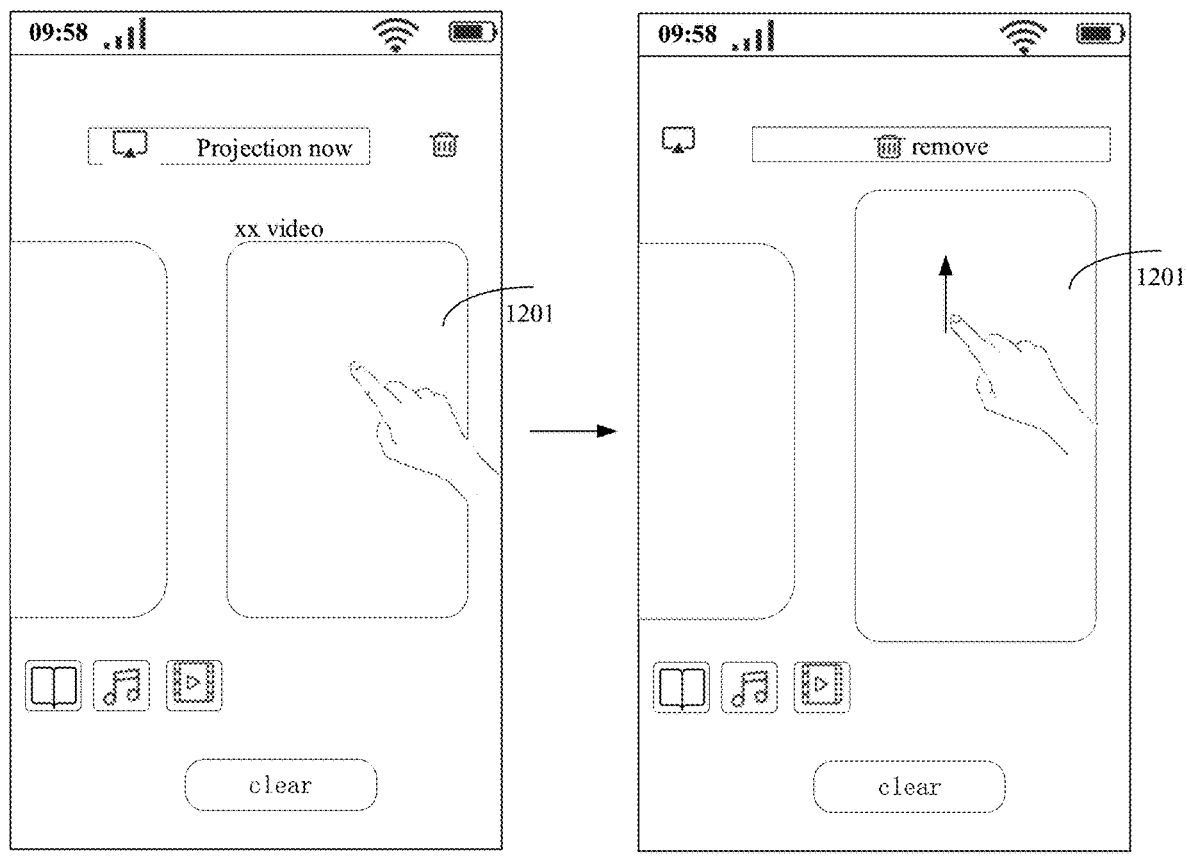
FIG. 12 is a schematic view of an application selection interface according to still another embodiment of the present disclosure.

In an implementation, as shown in FIG. 12, the second sliding operation signal corresponding to the option 1201 of the target second application is obtained. A removing instruction for the option of the target second application is determined as being received, in response to the second sliding operation signal controlling the option 1201 of the target second application to move to the target region. The removing instruction is an instruction configured to remove the application.

In an implementation, the option of the application corresponds to a screen projection control and a removing control. In response to the mobile terminal receiving the first sliding operation signal for the option of the application, the projection control is displayed firstly, and the removing control is zoomed out and moved to a top right corner to stand by. In response to the mobile terminal receiving the second sliding operation signal for the option of the application, the removing control is displayed firstly, and the projection control is zoomed out and moved to the top left corner to stand by.

In an implementation, the option of the application is movable from left to right. The mobile terminal obtains the sliding operation signal corresponding to the option of the target second application. The mobile terminal determines, in response to the option of the target second application satisfying a first offset trend under control of the sliding operation signal, that the second instruction for the target second application is received. The mobile terminal determines, n response to the option of the target second application satisfying a second offset trend under control of the sliding operation signal, that the removing instruction for the option of the target second option is received. The offset trend of the option of the target second application may be determined based on an initial position of the option of the target second application and a position of the option of the target second application after the movement.

It should be noted that the above embodiment is described by illustrating performing operations on the target second application. Operations performed on the first application is similar to that performed on the target second application. Operations performed on the first application may be referred to the description of performing operation on the target second application.

In summary, according to the embodiment of the present disclosure, the instruction is triggered by receiving a sliding operation signal for the option of the application, which may be performed easily.

An apparatus embodiment will be described in the following, which is configured to perform the method embodiments. Any undisclosed detail of the apparatus may be referred to the method embodiments.

Figure 13:
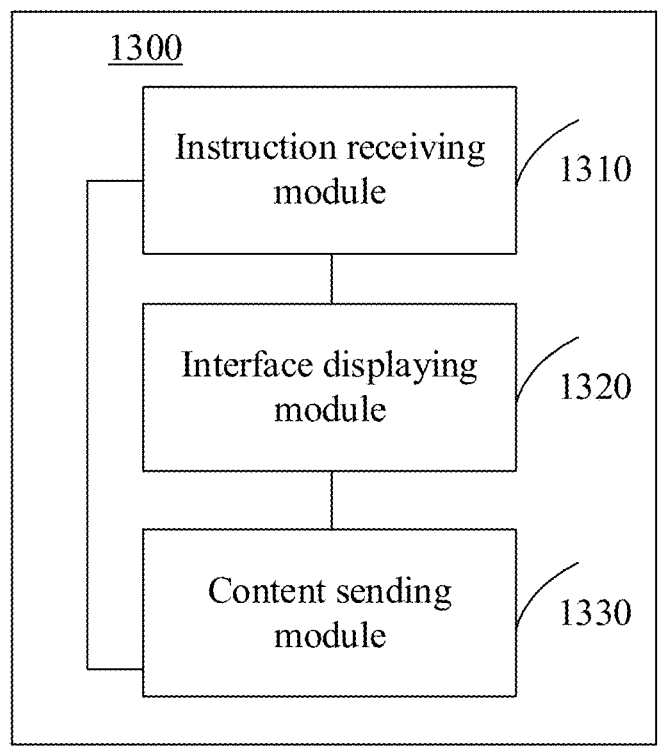
FIG. 13 is a block diagram of a screen projection displaying apparatus according to an embodiment of the present disclosure.

FIG. 13 is a block diagram of a screen projection displaying apparatus according to an embodiment of the present disclosure. The apparatus has a function of achieving the above method embodiments. The function may be achieved by hardware or by hardware executing corresponding software. The apparatus 1300 may include the following.

An instruction receiving module 1310 is configured to receive the first instruction in response to the content of the interface of the first application being displayed on the screen projection display device. The first application is an application running on the mobile terminal.

An interface displaying module 1320 is configured to display, in response to the first instruction, the application selection interface. The application selection interface includes an option of at least one second application.

The instruction receiving module 1310 is further configured to receive the second instruction specifically for the target second application of the at least one second application.

The content sending module 1330 is configured to project, in response to the second instruction, the content of the interface of the target second application to the screen projection display device.

According to the above description, in the present disclosure, the target second application may be selected from the application selection interface. The application selection interface includes the option of at least one second application. The user may trigger the instruction for the target second application in the application selection interface. In this way, the screen projection display device may display the content of the interface of the target second application. Compared to the art where the user needs to open the user interface of the application and find the screen projection control to trigger the content of the screen-projection switching interface, the present disclosure provides a simplified process of switching the screen-projection content, and the efficiency of switching the screen-projection content may be improved.

In an embodiment, the at least one second application has one option, and the option corresponds to one screen projection control.

The instruction receiving module 1310 is configured to:
determine, in response to the trigger operation performed on the screen projection control corresponding to the option of the target second application, that the second instruction for the target second application is received.

In an embodiment, the apparatus further includes:
an animation playing module (not shown in the drawings), configured to play a preset animation; and
a state switching module (not shown in the drawings), configured to switch, after playing the preset animation is completed, the displaying state of the screen projection control corresponding to the option of the target second application from the unprojected displaying state into the projection-and-displaying state.

In an embodiment, the apparatus further includes the option of the first application and the screen projection control corresponding to the option of the first application.

The content sending module 1330 is further configured to:
in response to the trigger operation performed on the screen projection control corresponding to the option of the first application, terminate the projection of the content of the interface of the first application to the screen projection display device.

In an embodiment, the apparatus further includes the following.

A state switching module (not shown in the drawings) is configured to switch the displaying state of the screen projection control corresponding to the option of the first application from the projection-and-displaying state into the projection cancellation confirmation state.

The content sending module 1330 is further configured to perform, response to the trigger operation performed on the screen projection control which is in the projection cancellation confirmation state, the operation of terminating the projection of the content of the interface of the first application to the screen projection display device.

In an embodiment, the instruction receiving module 1310 is configured to:
obtain the first sliding operation signal corresponding to the option of the target second application; and
determine, in response to the first sliding operation signal controlling the option of the target second application to move to a target region of the screen of the mobile terminal, that the second instruction for the target second application is received.

In an embodiment, the at least one second application has one option, and the option corresponds to one screen projection control.

The apparatus further includes the following.

A screen projection switching module (not shown in the drawings) is configured to switch the displaying state of the screen projection control corresponding to the option of the target second application from the unprojected displaying state into the screen projection confirmation state in response to the first sliding operation signal controlling the option of the target second application to move to the target region of the screen of the mobile terminal.

In an embodiment, the apparatus further includes a signal receiving module (not shown in the drawings), configured to:
obtain a sliding operation signal corresponding to the option of the target second application;
determine, in response to the sliding operation signal satisfying the first trend, that the first sliding operation signal for the option of the target second application is received; and
determine, in response to the sliding operation signal satisfying the second trend, that the second sliding operation signal for the option of the target second application is received. The first trend and the second trend are two different trends.

In an embodiment, the at least one second application has one option, and the option corresponds to one screen projection control.

The apparatus further includes the following.

A control displaying module (not shown in the drawings) is configured to display the screen projection control corresponding to the option of the target second application in the target region, in response to determining that the first sliding operation signal for the option of the target second application is received.

In an embodiment, the at least one second application has one option, and the option corresponds to one removing control.

The apparatus further includes the following.

The control displaying module (not shown in the drawings) is configured to display the removing control corresponding to the option of the target second application in the target region, in response to determining that the second sliding operation signal for the option of the target second application is received.

In an embodiment, the instruction receiving module 1310 is configured to:
 obtain the upward sliding operation signal corresponding to the system desktop; and
 determine, in response to the upward sliding operation signal, that the first instruction is received.

In an embodiment, the interface displaying module 1320 is configured to:
 display the application selection screen at an upper level of the system desktop.

It should be noted that the device provided by the above embodiment is divided based on functional modules when realizing functions. In practice, the above-mentioned functions may be assigned to different functional modules according to needs, i.e., an internal structure of the device is divided into different functional modules in order to fulfil all or some of the above-mentioned functions. In addition, the device provided in the above embodiment and the method implementation belong to a same concept. Specific implementation may be referred to the description of the method implementation, which will not be repeated here.

Figure 14:
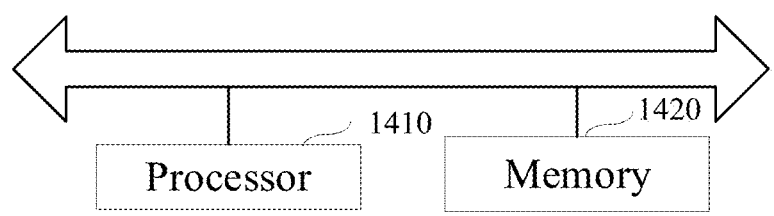
FIG. 14 is a structural diagram of a mobile terminal according to an embodiment of the present disclosure.

FIG. 14 is a structural diagram of a mobile terminal according to an embodiment of the present disclosure.

The mobile terminal in the present embodiment may include one or more of: a processor 1410 and a memory 1420.

The processor 1410 may include one or more processing cores. The processor 1410 uses various interfaces and lines to connect various parts within the entire mobile terminal to perform various functions and process data of the mobile terminal by running or executing instructions, programs, code sets or instruction sets stored in the memory 1420, and by invoking data stored in the memory 1420. In some embodiments, the processor 1410 may be implemented in at least one of the hardware forms: digital signal processing (DSP), a field-programmable gate array (FPGA), a programmable logic array (PLA). The processor 1410 may integrate one or a combination of one or more of the central processing unit (CPU) and the modem. The CPU primarily processes operating systems and applications, and so on. The modem is configured to process wireless communications. It is understood that the above modem may also be implemented on a separate chip without being integrated into the processor 1410.

In some embodiments, the processor 1410 implements the methods provided by the various method embodiments described above when executing the program instructions in the memory 1420.

The memory 1420 may include a random access memory (RAM) or may further include a read-only memory (ROM). In some embodiments, the memory 1420 includes a non-transitory computer-readable storage medium. The memory 1420 may be used to store instructions, programs, codes, code sets or instruction sets. The memory 1420 may include a program storage area and a data storage area. The program storage area may store instructions for implementing an operating system, instructions for at least one function, instructions for implementing each of the method embodiments described above, and so on. The data storage area may store data created while using the mobile terminal.

The above-mentioned structure of the mobile terminal is only schematic. In practical implementation, the mobile terminal may include more or less components, such as a display, and so on. The present embodiment does not limit the components herein.

It will be understood by any ordinary skilled person in the art that the structure illustrated in FIG. 14 does not constitute a limitation of the mobile terminal, and more or fewer components than illustrated or a combination of certain components or a different arrangement of components may be included.

In the embodiments, the memory 1420 of the above mobile terminal stores a computer program which is loaded and executed by the processor 1410 to implement the following screen projection displaying method.

The first instruction is received, in response to the content of the interface of the first application being displayed on the screen projection display device. The first application is an application running on the mobile terminal.

In response to the first instruction, the application selection interface is displayed. The application selection interface includes an option of at least one second application.

The second instruction specifically for the target second application of the at least one second application is received.

In response to the second instruction, the content of the interface of the target second application is projected to and displayed on the screen projection display device.

In an embodiment, the at least one second application has one option, and the option corresponds to one screen projection control.

The operation of receiving the second instruction specifically for the target second application of the at least one second application includes the following.

In response to the trigger operation performed on the screen projection control corresponding to the option of the target second application, it is determined that the second instruction for the target second application is received.

In an embodiment, after receiving the second instruction specifically for the target second application of the at least one second application, the method further includes the following.

A preset animation is played.

After playing the preset animation is completed, the displaying state of the screen projection control corresponding to the option of the target second application is switched from the unprojected displaying state into the projection-and-displaying state.

In an embodiment, the application selection interface further includes the option of the first application and the screen projection control corresponding to the option of the first application.

Before receiving the second instruction specifically for the target second application of the at least one second application, the method further includes the following.

In response to the trigger operation performed on the screen projection control corresponding to the option of the first application, projecting the content of the interface of the first application to the screen projection display device is terminated.

In an embodiment, before terminating projecting the content of the interface of the first application to the screen projection display device, the method further includes the following.

The displaying state of the screen projection control corresponding to the option of the first application is switched from the projection-and-displaying state into the projection cancellation confirmation state.

In response to the trigger operation performed on the screen projection control which is in the projection cancellation confirmation state, the operation of terminating projecting the content of the interface of the first application to the screen projection display device is performed.

In an embodiment, the operation of receiving the second instruction specifically for the target second application of the at least one second application includes the following.

The first sliding operation signal corresponding to the option of the target second application is received.

In response to the first sliding operation signal controlling the option of the target second application to move to the target region of the screen of the mobile terminal, it is determined that the second instruction for the target second application is received.

In an embodiment, the at least one second application has one option, and the option corresponds to one screen projection control.

After receiving the second instruction specifically for the target second application of the at least one second application, the method further includes the following.

The displaying state of the screen projection control corresponding to the option of the target second application is switched from the unprojected displaying state into the screen projection confirmation state, in response to the first sliding operation signal controlling the option of the target second application to move to the target region of the screen of the mobile terminal.

In an embodiment, after displaying the application selection interface, the method further includes the following.

The sliding operation signal corresponding to the option of the target second application is obtained.

In response to the sliding operation signal satisfying the first trend, it is determined that the first sliding operation signal for the option of the target second application is received.

In response to the sliding operation signal satisfying the second trend, it is determined that the second sliding operation signal for the option of the target second application is received. The first trend and the second trend are two different trends.

In an embodiment, the at least one second application has one option, and the option corresponds to one screen projection control.

After receiving the sliding operation signal for the option of the target second application, the method further includes the following.

The screen projection control corresponding to the option of the target second application is displayed in the target region, in response to determining that the first sliding operation signal for the option of the target second application is received.

In an embodiment, the at least one second application has one option, and the option corresponds to one removing control.

After receiving the sliding operation signal for the option of the target second application, the method further includes the following.

The removing control corresponding to the option of the target second application is displayed in the target region, in response to determining that the second sliding operation signal for the option of the target second application is received.

In an embodiment, receiving the first instruction includes the following.

The upward sliding operation signal corresponding to the system desktop is obtained.

In response to the upward sliding operation signal, it is determined that the first instruction is received.

In an embodiment, displaying the application selection interface includes the following.

The application selection interface is displayed at an upper level of the system desktop.

Any detail not described in the present embodiment may be referred to the method embodiments above.

In an embodiment, a computer readable storage medium is provided. The computer readable storage medium has a computer program stored therein, the computer program is loaded and executed by a processor of the mobile terminal to implement the various operations in the above method embodiments.

In an embodiment, a computer program product is provided. The computer program product includes computer instructions, the computer instructions are stored in a computer readable storage medium. A processor of the mobile terminal reads the computer instructions from the computer readable storage medium, and the processor executes the computer instructions, such that the mobile terminal performs the above-described screen projection displaying method.

The above description shows only exemplary embodiments of the present disclosure and are not intended to limit the present disclosure. Any modifications, equivalent substitutions, improvements, and so on, performed within the spirit and principles of the present disclosure shall be included within the scope of the present disclosure.

What is claimed is:

1. A screen projection displaying method, performed by a mobile terminal, the method comprising:
   receiving, when content of an interface of a first application is displayed on a screen projection display device, a first instruction, wherein the first application is an application running on the mobile terminal, wherein the first instruction is an application switching instruction for switching the first application being displayed on the screen projection display device;
   displaying, in response to the first instruction, an application selection interface in a screen of the mobile terminal, wherein the application selection interface comprises at least one second application, each of the at least one second application has an option, wherein, at the time when the application selection interface is being displayed in the screen of the mobile terminal, the content of the interface of the first application is being displayed on the screen projection display device;
   receiving a second instruction for a target second application of the at least one second application; and
   projecting, in response to the second instruction, content of an interface of the target second application to the screen projection display device.

2. The method according to claim 1, wherein each of the at least one second application has one option, and the option corresponds to one screen projection control; and
   the receiving a second instruction specifically for a target second application of the at least one second application, comprises:
      determining, in response to a trigger operation performed on the screen projection control corresponding to the option of the target second application, that the second instruction for the target second application is received.

3. The method according to claim 2, wherein after the receiving a second instruction specifically for a target second application of the at least one second application, the method further comprises:
   playing a preset animation;
   switching a displaying state of the screen projection control corresponding to the option of the target second application from an unprojected displaying state into a projection-and-displaying state, after playing the preset animation is completed.

4. The method according to claim 2, wherein the application selection interface further comprises an option of the first application and a screen projection control corresponding to the option of the first application; and
   before the receiving a second instruction specifically for a target second application of the at least one second application, the method further comprises:
      terminating, in response to a trigger operation performed on the screen projection control corresponding to the option of the first application, projecting the content of the interface of the first application to the screen projection display device.

5. The method according to claim 4, wherein before the terminating projecting the content of the interface of the first application to the screen projection display device, the method further comprises:
   switching a displaying state of the screen projection control corresponding to the option of the first application from a projection-and-displaying state into a projection cancellation confirmation state; and
   performing, in response to a trigger operation performed on the screen projection control which is in the projection cancellation confirmation, the operation of terminating projecting the content of the interface of the first application to the screen projection display device.

6. The method according to claim 1, wherein the receiving a second instruction specifically for a target second application of the at least one second application, comprises:
   obtaining a first sliding operation signal corresponding to the option of the target second application; and
   determining, in response to the first sliding operation signal controlling the option of the target second application to move to a target region of a screen of the mobile terminal, that the second instruction for the target second application is received.

7. The method according to claim 6, wherein the at least one second application has one option, and the option corresponds to one screen projection control; and
   after the obtaining a first sliding operation signal corresponding to the option of the target second application, the method further comprises:
      switching, in response to the first sliding operation signal controlling the option of the target second application to move to the target region of the screen of the mobile terminal, a displaying state of the screen projection control corresponding to the option of the target second application from an unprojected displaying state into a screen projection confirmation state.

8. The method according to claim 6, wherein after the displaying an application selection interface, the method further comprises:
   obtaining a sliding operation signal corresponding to the option of the target second application;
   determining, in response to the sliding operation signal satisfying a first trend, that the first sliding operation signal for the option of the target second application is received; and
   determining, in response to the sliding operation signal satisfying a second trend, that a second sliding operation signal for the option of the target second application is received, wherein the first trend and the second trend are two different trends.

9. The method according to claim 8, wherein the at least one second application has one option, and the option corresponds to one screen projection control; and
   after the obtaining a sliding operation signal corresponding to the option of the target second application, the method further comprises:
      displaying a screen projection control corresponding to the option of the target second application in the target region, in response to determining that the first sliding operation signal for the option of the target second application is received.

10. The method according to claim 8, wherein the at least one second application has one option, and the option corresponds to one removing control; and
    after the obtaining a sliding operation signal corresponding to the option of the target second application, the method further comprises:
       displaying a removing control corresponding to the option of the target second application in the target region, in response to determining that the second sliding operation signal for the option of the target second application is received.

11. The method according to claim 1, wherein the receiving a first instruction, comprises:
    obtaining an upward sliding operation signal corresponding to a system desktop; and
    determining, in response to the upward sliding operation signal, that the first instruction is received.

12. The method according to claim 11, wherein the displaying an application selection interface, comprises:
    displaying the application selection interface at an upper level of the system desktop.

13. A mobile terminal, comprising a processor and a memory, wherein the memory stores computer programs, the computer programs are loaded and executed by the processor to perform a screen projection displaying method including operations of:
    receiving, when content of an interface of a first application is displayed on a screen projection display device, a first instruction, wherein the first application is an application running on the mobile terminal, wherein the first instruction is an application switching instruction for switching the first application being displayed on the screen projection display device;
    displaying, in response to the first instruction, an application selection interface in a screen of the mobile terminal, wherein the application selection interface comprises at least one second application, each of the at least one second application has an option, wherein, at the time when the application selection interface is being displayed in the screen of the mobile terminal, the content of the interface of the first application is being displayed on the screen projection display device;
    receiving a second instruction specifically for a target second application of the at least one second application; and projecting, in response to the second instruction, content of an interface of the target second application to the screen projection display device.

14. The mobile terminal according to claim 13, wherein each of the at least one second application has one option, and the option corresponds to one screen projection control; and while receiving the second instruction specifically for the target second application of the at least one second application, the computer programs are loaded and executed by the processor to further perform operations of:

determining, in response to a trigger operation performed on the screen projection control corresponding to the option of the target second application, that the second instruction for the target second application is received.

15. The mobile terminal according to claim 14, wherein after receiving the second instruction specifically for the target second application of the at least one second application, the computer programs are loaded and executed by the processor to further perform operations of:

playing a preset animation;

switching a displaying state of the screen projection control corresponding to the option of the target second application from an unprojected displaying state into a projection-and-displaying state, after playing the preset animation is completed.

16. The mobile terminal according to claim 14, wherein the application selection interface further comprises an option of the first application and a screen projection control corresponding to the option of the first application; and before receiving the second instruction specifically for the target second application of the at least one second application, the computer programs are loaded and executed by the processor to further perform operations of:

terminating, in response to a trigger operation performed on the screen projection control corresponding to the option of the first application, projecting the content of the interface of the first application to the screen projection display device.

17. The mobile terminal according to claim 16, wherein before terminating projecting the content of the interface of the first application to the screen projection display device, the computer programs are loaded and executed by the processor to further perform operations of:

switching a displaying state of the screen projection control corresponding to the option of the first application from a projection-and-displaying state into a projection cancellation confirmation state; and performing, in response to a trigger operation performed on the screen projection control which is in the projection cancellation confirmation, the operation of terminating projecting the content of the interface of the first application to the screen projection display device.

18. The mobile terminal according to claim 13, wherein while receiving the second instruction specifically for the target second application of the at least one second application, the computer programs are loaded and executed by the processor to further perform operations of:

obtaining a first sliding operation signal corresponding to the option of the target second application; and determining, in response to the first sliding operation signal controlling the option of the target second application to move to a target region of a screen of the mobile terminal, that the second instruction for the target second application is received.

19. The mobile terminal according to claim 17, wherein the at least one second application has one option, and the option corresponds to one screen projection control; and after obtaining the first sliding operation signal corresponding to the option of the target second application, the computer programs are loaded and executed by the processor to further perform operations of:

switching, in response to the first sliding operation signal controlling the option of the target second application to move to the target region of the screen of the mobile terminal, a displaying state of the screen projection control corresponding to the option of the target second application from an unprojected displaying state into a screen projection confirmation state.

20. A non-transitory computer-readable storage medium, storing computer programs, wherein the computer programs are loaded and executed by a processor to perform operations of:

receiving, when content of an interface of a first application is displayed on a screen projection display device, a first instruction, wherein the first application is an application running on the mobile terminal, wherein the first instruction is an application switching instruction for switching the first application being displayed on the screen projection display device;

displaying, in response to the first instruction, an application selection interface in a screen of a mobile terminal, wherein the application selection interface comprises at least one second application, each of the at least one second application has an option, wherein, at the time when the application selection interface is being displayed in the screen of the mobile terminal, the content of the interface of the first application is being displayed on the screen projection display device;

receiving a second instruction specifically for a target second application of the at least one second application; and projecting, in response to the second instruction, content of an interface of the target second application to the screen projection display device.

* * * * *